United States Patent [19]

Perman

[11] 4,318,430
[45] Mar. 9, 1982

[54] APPARATUS FOR MAKING RECHARGEABLE ELECTRODES FOR ELECTROCHEMICAL CELLS

[75] Inventor: Gifford T. Perman, Gainesville, Fla.

[73] Assignee: General Electric Company, Gainesville, Fla.

[21] Appl. No.: 91,994

[22] Filed: Nov. 7, 1979

[51] Int. Cl.³ .................... H01M 7/00; B05C 11/00
[52] U.S. Cl. ............................................ 141/32; 83/302
[58] Field of Search ............... 29/2; 83/302, 332; 141/1.1, 32, 33, 73, 80, 125, 131, 280, 324, 325

[56] References Cited

U.S. PATENT DOCUMENTS

| | | | |
|---|---|---|---|
| 1,485,426 | 3/1924 | Norris | 141/32 |
| 1,487,774 | 3/1924 | Willard | 141/32 |
| 1,592,691 | 7/1926 | Engel | 141/12 |
| 1,863,175 | 6/1932 | Watkins | 141/32 |
| 2,175,943 | 10/1939 | Luhrman | 141/32 |
| 2,327,103 | 8/1943 | Gude | 83/302 |
| 2,555,301 | 6/1951 | Chubb | 141/1.1 |
| 2,680,547 | 6/1954 | Donath | 141/32 |
| 3,095,633 | 7/1963 | Shannon | 29/2 |
| 3,272,654 | 9/1966 | Lang | 29/2 |
| 3,432,351 | 3/1969 | Davee et al. | 29/2 |
| 3,486,942 | 12/1969 | Hatterschide | 29/2 |
| 3,758,340 | 9/1973 | Adams | 141/1.1 |
| 3,814,628 | 6/1974 | Larkin | 427/115 |
| 3,859,135 | 1/1975 | Roberts | 141/1.1 |
| 3,881,654 | 5/1975 | Larkin | 239/127 |
| 3,894,886 | 7/1975 | Pankow et al. | 141/1.1 |
| 3,903,940 | 9/1975 | Durr et al. | 141/32 |
| 4,050,482 | 9/1977 | Ching et al. | 141/1.1 |

Primary Examiner—Frederick R. Schmidt
Attorney, Agent, or Firm—Morgan, Finnegan, Pine, Foley & Lee

[57] ABSTRACT

Apparatus for manufacturing rechargeable electrochemical cell electrodes of the type having a metal grid substrate and an electrochemically active material carried thereby, in which a continuously moving web of the metal grid substrate is fed to a paste applicator where active material is loaded into the spaces of the grid, the loaded grid then being passed through a set of driven sizing rollers for compressing the active material and grid and for extracting excess liquid, and thereafter being passed through a set of die rollers which cuts and trims the electrodes to the desired form. During transport of the continuous web, webs of disposable material, such as porous pasting paper, are conveyed in contact with one or both sides of the substrate as it progresses through the manufacturing stations.

13 Claims, 3 Drawing Figures

APPARATUS FOR MAKING RECHARGEABLE ELECTRODES FOR ELECTROCHEMICAL CELLS

This invention relates to the manufacture of electrodes for rechargeable electrochemical cells and, specifically, to improved apparatus enabling high quality, high performance electrodes to be produced on a continuous production line basis.

The present invention is particularly adapted to the manufacture of electrodes of the pasted type, i.e., a rechargeable cell electrodes constituted generally of a metal substrate serving as the current-collecting surface about and/or upon which an electrochemically active material is "pasted", i.e., pressed or compacted. By way of example, the positive electrode of a sealed rechargeable lead acid cell comprises a grid of solid lead filled with active material made of lead dioxide paste. The negative electrode similarly comprises a lead grid filled with sponge lead as the active material. In a typical cylindrical sealed lead acid cell, the positive and negative pasted electrodes, interleaved with fibrous separator layers, are stacked together in a predetermined spatial relationship and then spirally wound into an electrode coil assembly, which preferably includes current-collecting tabs extending from the coil to which terminals are connected.

Prior to the present invention, it has been the practice to manufacture pasted electrodes for such electrochemical cells by feeding the metal substrate through a conventional applicator mechanism which loads a flowable or semiflowable paste material onto the substrate. Such applicator mechanisms may include a series of paddles for feeding the paste material toward a rotating drum that carries the paste onto the substrate while simultaneously subjecting it to pressure. This pressure distributes the paste on the substrate and compacts it to a limited extent. In order to obtain the desired density of electrochemically active material on the substrate, however, a relatively dense active material paste is used. Upon removal of the excess water in the paste by drying, the density of the electrode plate diminishes; as a result, the power density of the finished cell, i.e., watts per gram of cell weight, is limited. In other manufacturing approaches, a different type of applicator is used wherein paste is extruded under much higher pressure onto the substrate. This type of apparatus may require intermittent advancement of the substrate and is not preferred for production on a continuously moving line.

Another aspect of known electrode manufacturing techniques has been the tendency to apply the paste to finite lengths of the substrate and subsequently to convey the pasted electrode structure to a stamping station for trimming and further cutting, where necessary. The difficulty with this approach is the requirement for handling separate electrode pieces, which slows down the manufacturing process and reqires equipment for intermittently advancing and aligning electrodes at the various manufacturing stations.

In the present invention, the foregoing and other drawbacks of known manufacturing techniques are overcome, manufacturing efficiency is increased, and electrodes having performance characteristics superior to electrodes produced by the prior art apparatus are obtained. In accordance with the invention, a continuous web of a metal grid substrate, having spaces for the reception of the electrochemically active material, is fed to paste applicator means for loading the spaces with the paste material constituted of the electrochemically active material. Following application of the paste, the web is received by sizing roller means which compacts the paste material into the spaces of the metal grid while simultaneously extracting excess liquid contained therein.

In the preferred embodiment, a web of pasting paper is conveyed in contact with each of the flat electrode web surfaces, both to protect the pasted surfaces and to act as an absorbent of excess liquid as the pasted substrate moves through subsequent processing steps. Additionally, the paste filled metal grid substrate, is preferably cut and trimmed while moving, and this is accomplished at roller die means downstream of the driven sizing roller means. Advantageously, the paste may be applied so as to leave one or more longitudinal strips of unpasted grid areas that can be trimmed to form current collecting tabs for connection to the cell terminals. In that connection, the pasted area of the grid has a lateral dimension which is a multiple of the lateral dimension of an individual electrode, so that the web may be slit into two or more widths upon passing through the roller die means, thus producing two or more electrodes for each unit length of web.

The foregoing and other aspects of the invention will be better understood from the following detailed description of the invention, together with the accompanying drawings in which.

Figure 1:
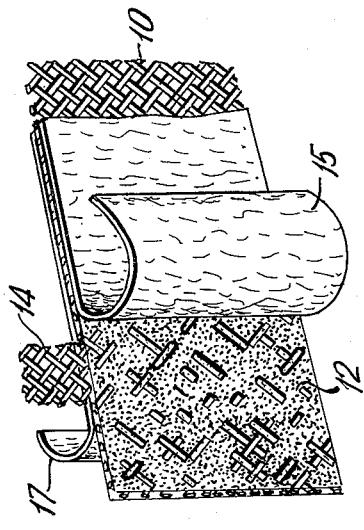
FIG. 1 is a perspective pictorial representation of an electrode manufactured according to the present invention.

FIG. 1 illustrates an electrochemical cell electrode of the type which can be manufactured in accordance with the invention. This type of electrode structure is used in sealed lead acid cells wherein the cell electrodes comprise a pair of electrodes, one positive electrode and one negative electrode, which is wound into a spiral coil and inserted into a cylindrical casing. A description of cells of this type will be found in the co-pending application of John W. Hooke, entitled "Vibration Resistant Electrochemical Cell Having Deformed Casing and Method Of Making Same", Ser. No. 25,060, filed Mar. 29, 1979 now U.S. Pat. No. 4,255,500 and assigned to the assignee of this invention.

The electrode is characterized by a metal grid substrate 10 which forms the current collector for the cell. Compacted into the spaces provided by the metal grid substrate 10 is a pressed electrochemically active material 12. In the case of a sealed lead acid type of cell, this material will be either lead dioxide for the positive electrode or sponge lead for the negative electrode. The grid would be essentially solid lead. This active material completely covers the metal grid except for the upstanding tab 14 extending from the electrode's top edge. The tab is uncovered by an active material and is used to electrically connect the electrode to external terminals. The manner in which this conductor tab 14 is mated to the external terminals is described in the above-mentioned co-pending application Ser. No. 25,060.

FIG. 1 also illustrates a layer of porous material 15, 17 contacting the active material 12 on each side of the electrode during the manufacture of the cell. This material 15 and/or 17 is used to form a carrier for the electrode as it moves through the manufacturing process and as an absorbent for excess liquid that may be contained in the paste material at the time it is applied to the grid, as will be explained below. This material is discarded prior to winding the electrodes and separator into the electrode coil.

Figure 2:
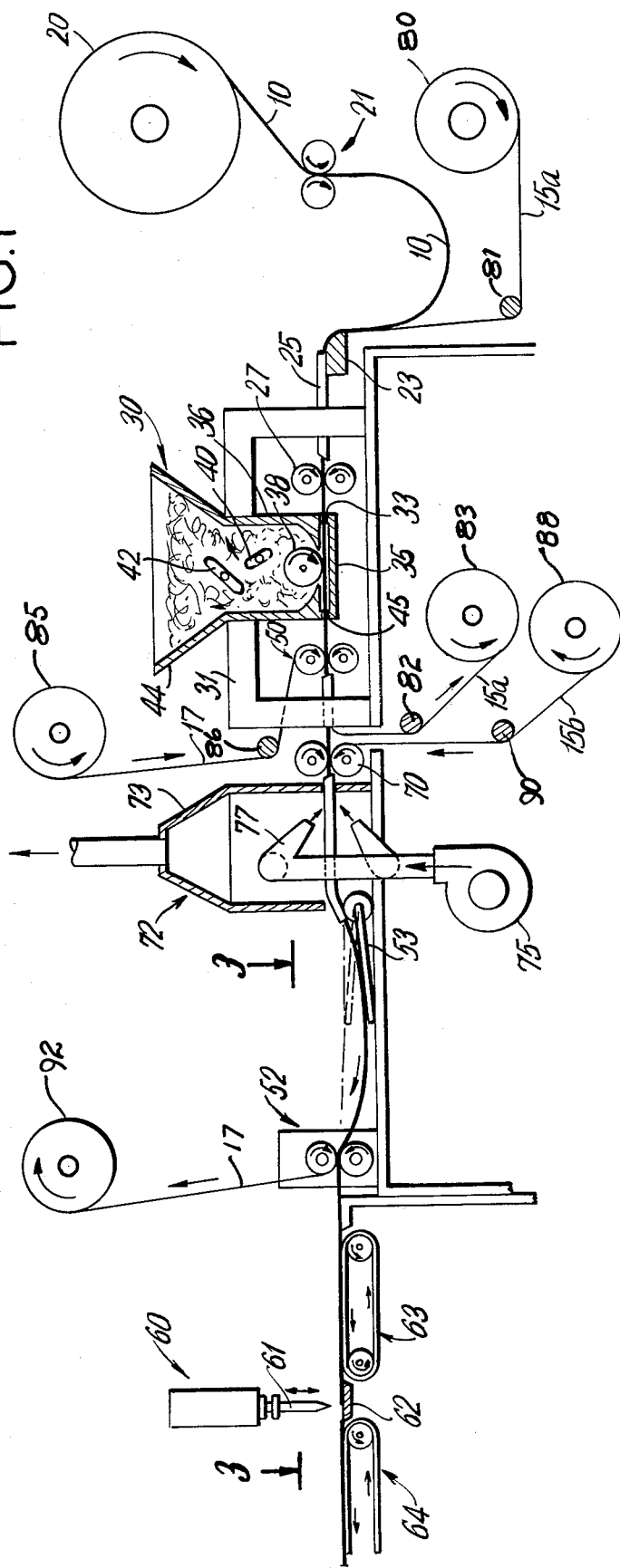
FIG. 2 is a schematic side elevational view of apparatus in accordance with the invention.

Referring now to FIG. 2, a web of expanded metal lead is supplied from a reel 20. As mentioned above, the width of the web is preferably at least double the required width for the manufacture of a single electrode such that, as one of the final steps, the web may be halved by slitting. After leaving the reel, the web 10 is passed through a pair of driven sizing rollers 21. These rollers are set to a dimension slightly smaller than the nominal grid thickness so that the web 10, upon exiting from the roller nip has a predetermined thickness of, for example, 0.055 inches.

From the driven sizing rollers 21, the lead grid is guided over a curved lip 23 onto a track 25 leading to a pair of idler rollers 27 just upstream of a paste applicator 30. This applicator is mounted in a frame 31 so that the sized expanded lead grid leaving the idler rollers 27 enters an entrance slot 33 in the paste applicator. The paste applicator is comprised generally of a lower pressure plate 35, a box portion 36 containing a driven knurled drum 38 and a set of revolving paddles 40, 42, and a hopper 44 into which is loaded the electrochemically active material in the form of a paste. The expanded metal grid 10, with the electrochemically active material now completely filling up and occupying the grid spaces, leaves the paste applicator 30 through an exit slot 45.

It will be understood by those skilled in the art that, as the continuously moving grid 10 passes from the entrance slot 33 to the exit slot 45, the past is worked downwardly by the paddles 40, 42 onto the rotating drum 38. This drum 38 transfers the paste onto the grid 10. The drum 38 has a predetermined spacing from the grid 10 and a predetermined speed relative to the speed of passage of the grid 10 through the paste applicator so as to achieve the desired application rate and thickness of the paste upon the grid.

Downstream of the applicator 30, the paste-filled grid is received in the nip of a pair of driven sizing rollers 50. As the moving web is advanced forwardly by the sizing rollers 50, it is simultaneously sized to a predetermined thickness. That is, as the web passes through the rollers 50, both the paste and grid are compressed to a predetermined thickness. This operation compresses and increases the density of the paste carried by the grid, while squeezing from the paste material the excess water which serves as a plasticizer for the paste. Sizing the electrode in this manner has been found to eliminate the necessity for forced drying of the electrode (though drying may still be carried out as an optional step) and provides superior electrical performance from the electrodes owing to an increased loading ($gm/cm^3$) of the metallic grid and a consequent improved power density (watts/kg.) from the assembled cell employing electrodes manufactured by the apparatus of FIG. 2.

In some prior art processes for manufacturing rechargeable electrodes, reliance is placed on the pressure exerted on the substrate web by a rotating drum, such as drum 38, or by an extruding mechanism, during application of the electrochemically active material. In such processes, a higher density paste is used initially; however, this higher initial density diminishes substantially as the electrode is subjected to forced air drying in order to remove the excess moisture. When this occurs, the electrochemically active material on the substrate becomes more porous and its density diminishes.

In the present apparatus, the reduction in thickness of the paste-load grid can be controlled by adjusting the pressure applied at the nip of the sizing die rollers 50. In general, however, the pressure is selected so as to achieve a reduction on the order of about 20% in the thickness of the electrode as compared to the thickness of grid stock entering the paste applicator. In one example, an expanded metal grid having a thickness of approximately 0.055 inches at the entrance side to the paste applicator was sized to about 0.043–0.045 inches on the exit side of the rollers 50.

Downstream of the sizing rollers 50 is a pair of roller dies 52. These are power driven at a rate that is synchronized with the rate at which the grid material leaves the sizing rollers 50. To that end, a sensing wand 53, gently biased against the underside of the web, senses an increase or decrease in the slack of material between the roller dies 52 and the sizing rollers 50. The speed of the roller dies 52 is adjusted in accordance with the rate of change in the loop dimensions sensed by the wand 53.

Figure 3:
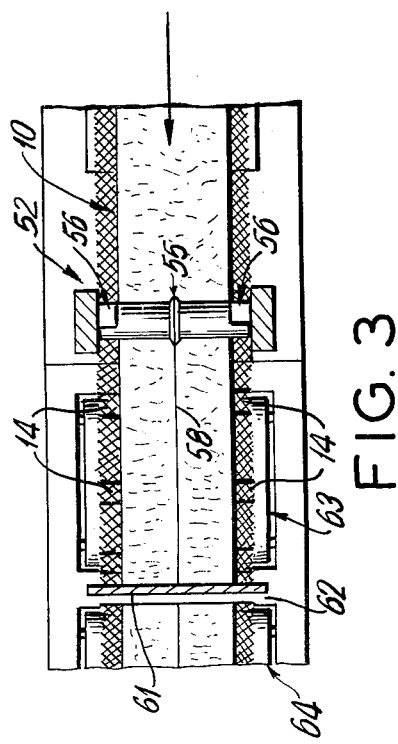
FIG. 3 is a plan view taken along the line 3—3 in FIG. 2.

In the plan view of FIG. 3, the cutting pattern of the roller dies can be observed. As shown, the roller dies 52 include a pair of rollers of which the top roller is formed with cutting surfaces, e.g., the slitting disk 55 and edge-shaping cutting edges 56 on the top roller die. This disk 55 slits the incoming web longitudinally at the middle to form an edge cut 58 forming the bottom edge of the electrode. The cutting edges 56 at the extremities of the roller trim the upper edge of the electrode and from the current-collecting tabs 14 for the electrodes.

After the moving web has been slit and trimmed by the roller dies 52, the two halves move to a cutter 60 having an actuatable cutting blade 61 operating intermittently in synchronism with the rate of motion of the incoming webs so as to cut them into finite predetermined lengths. To that end, the slit webs are carried into the cutter 60 by a moving conveyor belt 63; the cut-to-length electrodes are removed from the cutter by conveyor belt 64.

Referring once again to FIG. 2, it will be noted that certain additional equipment is shown in the operational positions between the sizing rollers 50 and roller dies 52. This equipment consists of a set of idler rollers 70 and a forced air heating unit 72. The heating unit comprises, in general, a vented hood 73, a blower fan 75 and ducts 77 for directing a sheet of drying air at the top and bottom surfaces of the moving web. Heating unit 72 has been found to be optional and, in many cases, unnecessary. Thus, in most cases, sufficient drying is achieved by the substantial pressure applied by the sizing rollers 50, and also by the use of webs of absorbent paper, applied as described below, moving in contact with the upper and lower surfaces of the paste-filled metal grid as it moves through the sizing rollers 50, idler roller 70 and roller dies 52.

As the unpasted web 10 moves over the guide 23 and track 25 into the nip of the idler rollers 27, it is mated at its bottom surface with a web of pasting paper 15a, supplied from a reel 80 over a guide 81. Pasting paper 15a performs more than one function: first, it acts as a carrier surface which isolates the bottom surface of the grid 10 from the machine elements and serves to prevent paste from sticking to the pressure plate 35 and sizing rollers 50. Second, it serves to soak up excess moisture which is squeezed from the pasted electrode as it passes through the rollers 50.

After the paper-grid composite leaves the applicator 30, the web of paper 15a, which a high-grade paper possessing good moisture absorbency and wet strength, is stripped from the electrode web and passed over a guide 82 onto a driven take-up reel 83. The paper web 15a is stripped from the moving electrode web at this point because of the tendency of the web and paper to expand to different degrees as they pass through the sizing rollers 50, thereby causing buckling and separation of one of the members from the other. In an alternate arrangement (not shown), a moving belt running between, for example, the bottom roller of the idler rollers 27 and a second roller at the exit side of the applicator 30, carries the metal grid 10 through the paste applicator and serves as the carrier. A doctor blade rubbing against the belt after it passes over, for example, the second roller scrapes excess paste from the belt into a container for reuse. In this arrangement, the pasting paper web 15a may optionally be omitted.

With reference again to the components illustrated in FIG. 2, a web 17 of pasting paper is also applied to the top surface of the pasted electrode as it exits from the paste applicator 30. A reel 85 feeds the web of paper 17 over guide 86 and about the top of the sizing roller 50. Thus, as the pasted grid moves through the sizing rollers 50, there is in contact with each of its surfaces a layer of pasting paper which isolates the grid from the roller surfaces. Just after the point where paper web 15a is stripped from the grid, another web of pasting paper 15b is fed from a reel 88 over guide 90 and into the nip of the idler rollers 70 in registered contact with the bottom surface of the pasted grid. Thus, the web of paper 15b replaces the web 15a which was stripped from the moving electrode.

Although the pasting paper may be left on both electrode surfaces at the time it is cut at station 60, it is preferable to remove automatically the top layer of paper prior to cutting. This is accomplished at take-up reel 92, which pulls the paper web 17 over the surface of the top roller pair 52 thereby separating it from the moving substantially dry electrode web. The paper web 15b at the underside of the paste-filled electrode 12 is retained, however, to provide a protective layer at the underside of the electrode as it passes through the cutting step and other operations. This pasting paper is pulled off before the electrode is mated with the other electrode and formed into a coil.

From the foregoing, it is seen that the invention provides a method and apparatus by which pasted-type electrodes for electrochemical cells can be manufactured on a continuous production line. The use of a continuous web current-collecting substrate to receive the active material paste, together with the step of subjecting the pasted metal substrate to the application of localized high pressure at a pair of sizing rollers contributes to the density of the active material on the electrode and the power density of the finished cell. The use of webs of pasting paper at the upper and lower surfaces of the moving electrode web contributes to the removal of excess liquid from the paste and the avoidance of unnecessary forced air drying, and protects the pasted electrode surface as it moves along through the manufacturing steps.

Although the invention has been described with reference to specific apparatus, certain modifications and variations may be made without departing from the invention. For example, the paste applicator is representative of those which are commercially available and other types may be used. Nevertheless, the one which is shown and described in this application is preferred, as it does not require the use of a dense paste and elevated application pressures. Other modifications that can be made are the omission of the forced drying step and, in certain instances, elimination of the idler rollers 70. Thus, it may be possible to replace the idler rollers 70 with a guide, particularly where the run between that guide and the roller dies is a short one. Another modification within the scope of the invention is the alteration of cutting surfaces on the roller dies 52. Specifically, the cutting edges may be rearranged such that the tabs 14 are cut into the electrode along its longitudinal center line, in which case an unpasted longitudinally extending grid area is formed at the center of the electrode web, rather than along each edge.

What is claimed is:

1. Apparatus for the manufacture of electrodes for rechargeable electrochemical cells, wherein the electrodes include a metal grid substrate and an electrochemically active material carried thereby, the apparatus comprising:
   means for feeding to a paste applicator a continuous web of metal grid substrate having spaces therein for the reception of the electrochemically active material;
   grid substrate sizing means upstream of the paste applicator means for sizing the thickness of said grid to a predetermined value prior to the application of paste thereto, said thickness value being less than the thickness of the grid upstream of the sizing means;
   paste applicator means for loading the spaces of the sized metal grid with a paste comprising the electrochemically active material, said applicator including a paste transfer drum rotating about an axis extending transversely of the grid and parallel to the plane thereof, said drum receiving the paste and having a predetermined speed and spacing relative to the grid so as to distribute the desired amount of paste onto said grid;
   driven sizing roller means receiving the paste-filled continuous substrate grid for compressing the paste material in the spaces of the metal grid to a predetermined dimension, and for extracting excess liquid contained in said paste while increasing the density thereof in the spaces of the grid.

2. The apparatus of claim 1, further comprising:
   roller die means downstream of said driven sizing roller means for continuously trimming said paste-filled substrate to a predetermined form.

3. Apparatus according to claim 2, wherein said roller die means slits said substrate longitudinally so as to subdivide said web into plural continuous paste-filled substrate grids.

4. Apparatus according to claim 2, wherein said paste applicator applies paste to said grid so as to leave a longitudinally extending strip area thereof exposed, said roller die means being operative to continuously trim said longitudinally extending strip area of said grid so as to form at an edge of said paste-filled grid projecting tabs for the subsequent affixation of terminals thereto upon assembly of the electrochemical cells.

5. Apparatus according to claim 2, further comprising: cutting means downstream of said roller die means for cutting said paste-filled continuous substrate grid to predetermined lengths.

6. Apparatus according to claim 1, wherein said feeding means continuously supplies said metal grid web to said applicator means.

7. Apparatus according to claim 1, wherein said grid comprises a web of expanded metal.

8. Apparatus according to claim 1, wherein said applicator means forces the paste material into the spaces of the middle grid substrate from one side thereof, the apparatus further comprising:

means supplying a continuous web of porous material in registered contact with the opposite side of said grid prior to the application of paste thereto, said porous material providing a removable carrier for said paste-filled substrate grid during the application of paste thereto.

9. Apparatus according to claim 8, further comprising:

means supplying a second continuous web of porous material in contact with said one side of the paste-filled substrate downstream of said applicator means and upstream of said driven sizing roller means.

10. Apparatus according to claim 9, further comprising: means downstream of said driven sizing roller means for continuously stripping said second web of disposable material from the moving paste-filled metal grid substrate.

11. Apparatus according to claim 8, further comprising: means for continuously stripping said web of porous material from said opposite side of the grid at a point downstream of said driven sizing roller means.

12. Apparatus according to claim 11, further comprising: means supplying a further continuous web of porous material in registered contact with said opposite side of the grid downstream of said stripping means so as to replace said stripped web of porous material.

13. Apparatus for the manufacture of electrodes for rechargeable electrochemical cells, wherein the electrodes include a metal grid substrate and an electrochemically active material carried thereby, and apparatus comprising:

grid substrate sizing means upstream of the paste applicator means for sizing the thickness of said grid to a predetermined value prior to the application of paste thereto, said thickness value being less than the thickness of the grid upstream of the sizing means;

means for feeding to a paste applicator a continuous web of a metal grid substrate having spaces therein for the reception of the electrochemically active material;

paste applicator means for loading the spaces of the metal grid with a paste comprising the electrochemically active material;

paste applicator means for loading the spaces of the metal grid with a paste comprising the electrochemically active material, said applicator including a paste reservoir and a transfer drum rotating about an axis extending transversely of the grid and parallel to the plane thereof, said drum communicating with the reservoir, having a transverse dimension which is less than the transverse dimension of said grid, and being rotatable at a predetermined speed and having a predetermined spacing relative to the grid so as to apply a desired amount of paste material onto said grid while leaving a longitudinally extending strip area of the grid exposed;

driven sizing roller means receiving the paste-filled continuous substrate grid for compressing the paste material in the spaces of the metal grid to a predetermined dimension, and for extracting excess liquid contained in said paste while increasing the density thereof in the spaces of the metal grid; and roller die means downstream of said driven sizing roller means for continuously trimming said exposed longitudinally extending strip area of the paste filled substrate, said roller die means being operative to form at an edge at said strip area a plurality of projecting tabs for the subsequent affixation of terminals thereto upon assembly of the electrochemical cells.

* * * * *